United States Patent Office 3,801,533
Patented Apr. 2, 1974

---

3,801,533
FLAME RETARDANT POLYAMIDE COMPOSITIONS
Marvin T. Tetenbaum and Herman Stone, Convent, N.J., assignors to Allied Chemical Corporation, New York, N.Y.
No Drawing. Continuation-in-part of abandoned application Ser. No. 180,474, Sept. 14, 1971. This application June 8, 1972, Ser. No. 260,949
Int. Cl. C09k 3/28
U.S. Cl. 260—45.8 N          15 Claims

ABSTRACT OF THE DISCLOSURE

Certain substituted sulfonyl imide compounds impart flame retardance when blended with polyamides.

---

This application is a continuation-in-part of our previously filed co-pending application U.S. Ser. No. 180,474, filed Sept. 14, 1971, now abandoned.

This invention relates to flame retardant polyamide compositions. More particularly, this invention relates to polyamides made flame retardant by the addition of substituted sulfonyl imide compounds.

BACKGROUND OF THE INVENTION

Recent increasing public awareness and demand for safety of commercial products has led to new legislation requiring many types of plastic products, such as synthetic fibers, building materials and molded articles, to be fire retardant. This in turn has given new impetus to researchers to discover improved flame retardant additives and finishes which will meet these higher standards.

Numerous flame retardant additives for various polymers are known, generally halogen-containing compounds or organic phosphate compounds which have been found to impart some degree of flame retardance to polymers such as polyepoxides, polyesters, and polyurethanes. However, known fire retardant additives have been less than satisfactory when added to polyamides, commonly referred to as nylons, either due to lack of effectiveness or because they cause degradation of the physical properties of the polymer.

SUMMARY OF THE INVENTION

It is an object of the present invention to provide flame retardant polyamide compositions.

It is another object to provide flame retardant polyamide compositions having excellent physical properties.

Further objects will become apparent from the following detailed description thereof.

It has been discovered that certain substituted sulfonyl imide compounds, when added in minor amounts, impart flame retardance to polyamides.

DETAILED DESCRIPTION OF THE INVENTION

The substituted sulfonyl imide compounds useful in the invention have the formula

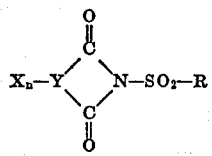

wherein Y is a cyclic hydrocarbon; R can be a hydrocarbon radical selected from the group consisting of alkyl, cycloalkyl, aryl, alkaryl and aralkyl, preferably of from 3 to 12 carbon atoms; a halogen-substituted hydrocarbon radical which can be alkyl, cycloalkyl, aryl, aralkyl or alkaryl, preferably of 3 to 12 carbon atoms and wherein the halogen substituents can be chlorine or bromine or both; an aryl group substituted with a nitro group; or an aryl group substituted with one or more sulfonimide groups; X can be a hydrocarbon radical, halogen-substituted hydrocarbon radical or halogen wherein these terms have the same meanings given above, and $n$ is an integer of 0–4.

In one embodiment of the invention the substituted sulfonylphthalimide compounds useful in the invention have the formula

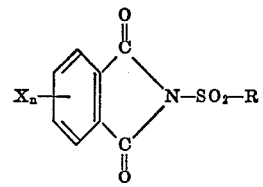

wherein R can be a hydrocarbon radical selected from the group consisting of alkyl, aryl, alkaryl and aralkyl, preferably of from 3 to 12 carbon atoms; a halogen-substituted hydrocarbon radical which can be alkyl, aryl, aralkyl or alkaryl, preferably of 3 to 12 carbon atoms and wherein the halogen substituents can be chlorine or bromine or both; or an aryl group substituted with one or more sulfonimide groups; X can be a hydrocarbon radical, halogen-substituted hydrocarbon radical or halogen wherein these terms have the same meanings given above, and $n$ is an integer of 0–4. In the preferred compounds of the invention, R is aryl, aralkyl, haloaryl, or sulfonimide-substituted aryl and $n$ is 0.

Illustrative of suitable flame retardants for polyamides within the scope of the invention are N-(p-toluenesulfonyl)phthalimide,
N-(phenylsulfonyl)phthalimide,
N-(p-bromophenylsulfonyl)phthalimide,
N-(3,5-dibromophenylsulfonyl)phthalimide,
N-(p-chlorophenylsulfonyl)phthalimide,
N-(3,5-dichlorophenylsulfonyl)phthalimide,
N-(2,4,5-trichlorophenylsulfonyl)phthalimide,
N-(2,3,5,6-tetrachlorophenylsulfonyl)phthalimide,
N-(t-butylsulfonyl)phthalimide,
N-(cumylsulfonyl)phthalimide,
N-(p-biphenylsulfonyl)phthalimide,
N-(naphthylsulfonyl)phthalimide,
N-(p-toluenesulfonyl)-4,5-dimethylphthalimide,
N-(p-toluenesulfonyl)-4,5-dichlorophthalimide,
N-(p-phenylsulfonyl)tetrachlorophthalimide,
N-(p-toluenesulfonyl)-5-(p-tolyl)-4-bromophthalimide,
1,3,5-benzenetrisulfonylphthalimide,
benzene-1-sulfonylphthalimide-4-sulfonylmaleimide,
N-2,4,6-trimethylbenzenesulfonylphthalimide,
N-p-nitrobenzenesulfonylphthalimide,
N-p-toluenesulfonyltetrabromophthalimide,
N-benzenesulfonyltetrabromophthalimide,
N-p-bromobenzenesulfonyltetrabromophthalimide,
N-(2,4,5-trichlorobenzenesulfonyl)tetrabromophthalimide,
N-benzenesulfonyltetrachlorophthalimide,
N-(p-toluenesulfonyl)tetrachlorophthalimide,
N-(p-toluenesulfonyl)5-norbornene-1,4,5,6,7,7-hexachloro-2,3-dicarboxylic imide,
N-(p-toluenesulfonyl)1,4-methanonaphthalene-1,2,3-dicarboxylic imide,
N-(p-toluenesulfonyl)1,4-methanonaphthalene-1,2,3,4,9,9-hexachloro-1,4,4a,5,6,7,8,8a-octahydro-6,7-dicarboxylic imide, and the like.

The substituted sulfonyl imides as described hereinabove are added to the polyamide in an amount effective to impart flame retardance to the polymer. A large excess of the additive should be avoided to prevent excessive degradation of the polymer's physical properties. In general the additives are added in amounts of from 0.5 to 25% by weight based on the total composition, preferably from 1 to 10% by weight, to impart flame retardance. The manner of their incorporation into the polymer is not critical. The additive can be blended with polyamide particles or pellets prior to forming operations, or added directly to the molten polymer during extrusion, spinning and the like.

The term polyamide herein includes polycarbonamides having recurring —CONH units along the polymer chain. Several polyamides are in wide use commercially, such as condensation polymers, e.g., polyhexamethyleneadipamide, polyhexamethylenesebacamide, and the like; polymers of lactams having 3–12 carbon atoms in the lactam ring, e.g. poly-β-lactam, polycaprolactam, polycaprylolactam, polyoenantholactam, polylauryllactam and the like; and terpolymers of a lactam with ethylene/alkyl acrylate, alkyl methacrylate, or vinyl acetate copolymers and the like.

As is known to one skilled in the art such polyamides can also contain heat and light stabilizers, mold lubricants, terminating agents, nucleating agents, delusterants, pigments, fillers and the like in effective amounts.

The invention will be further illustrated by the following detailed description thereof, but it is to be understood that the invention is not meant to be limited to the details described therein. In the examples, parts and percentages are by weight. Limiting Oxygen Index Tests (hereinafter LOI) were carried out according to the procedure given in ASTM Test D–2863.

EXAMPLES 1–6

Ninety parts of polycaprolactam (Plaskon 8200 of Allied Chemical Corporation) were blended with 10 parts of various substituted sulfonylphthalimide additives, extruded at 255° C. as a monofilament, pelletized and dried. The resultant product was compression molded. Results are summarized in the table below.

| Example | Additive | LOI |
|---|---|---|
| Control | | .245 |
| 1 | N-(p-toluenesulfonyl)phthalimide | .370 |
| 2 | N-(phenylsulfonyl)phthalimide | .380 |
| 3 | N-(p-bromophenylsulfonyl)phthalimide | .370 |
| 4 | N-(2,4,5-trichlorophenylsulfonyl)phthalimide | .370 |
| 5 | N-(methylsulfonyl)phthalimide | .295 |
| 6 | 1,3,5-benzene-trisulfonylphthalimide | .365 |

EXAMPLE 7

The procedure of Example 1 was followed except only 5% of the blend of the additive was present.
The LOI was .350.

EXAMPLE 8

The procedure of Example 1 was followed except only 2.5% of the blend of the additive was present.
The LOI was 0.300.

EXAMPLE 9

The procedure of Example 1 was followed except using 94.5 parts of a filled polycaprolactam (Plaskon 8200), containing 2% of asbestos fibers as the polyamide and 3.5 parts of N-(p-toluenesulfonyl)phthalimide.
The LOI was 0.314.

EXAMPLE 10

The procedure of Example 9 was followed except substituting a filled polycaprolactam containing 2% of ¼" glass fibers as the polyamide.
The LOI was 0.268.

EXAMPLE 11

The procedure of Example 9 was followed except substituting a filled polycaprolactam containing 2% of a chopped aromatic polyamide derived from isophthalic acid and m-phenylenediamine as the polyamide.
The LOI was 0.278.

EXAMPLE 12

The procedure of Example 1 is followed except substituting a polyhexamethylenedipamide having a reduced viscosity in m-cresol of 1.7 as the polyamide.
Similar LOI results are obtained.

EXAMPLES 13–20

The procedure of Example 1 is followed for Examples 13–20 and the results summarized below.

| Ex. | Additive | Loading, percent | LOI |
|---|---|---|---|
| 13 | N-2,4,6-trimethylbenzenesulfonylphthalimide | 3 | .280 |
| 14 | N-p-nitrobenzenesulfonylphthalimide | 10 | .345 |
| 15 | 1,3,5-benzene-trisulfonylphthalimide | 5 | .365 |
| 16 | N-(p-toluenesulfonyl)tetrachlorophthalimide | 5 | .285 |
| 17 | N-(p-toluenesulfonyl)tetrachlorophthalimide plus $Sb_2O_3$ | 5 | .300 |
| 18 | N-(p-toluenesulfonyl)5-norbornene-1,4,5,6,7,7-hexachloro-2,3-dicarboxylic imide | 5 | .260 |
| 19 | N-(p-toluenesulfonyl)5-norbornene-1,4,5,6,7,7-hexachloro-2,3-dicarboxylic imide | 5 | .265 |
| 20 | N-(p-toluenesulfonyl)1,4-methanonaphthalene-1,2,3,4,9,9-hexachloro-1,4,4a,5,6,7,8,8a-octahydro-6,7-dicarboxylic imide | 5 | .260 |

We claim:

1. A flame retardant composition comprising a polyamide having recurring amide groups as part of the polymer chain and an effective amount of a substituted sulfonyl imide compound of the formula.

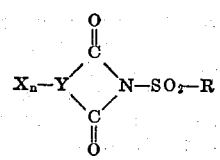

wherein Y is a cyclic hydrocarbon selected from the group consisting of phenyl, norbornenyl, 1,4-methanonaphthyl and 1,4,4a,5,6,7,8,8a-octahydro-1,4-methanonaphthyl; R can be a hydrocarbon radical selected from the group consisting of alkyl, cycloalkyl, aryl, alkaryl and aralkyl; a halogen-substituted hydrocarbon radical which can be alkyl, cycloalkyl, aryl, aralkyl or alkaryl and wherein the halogen substituents can be chlorine or bromine or both; an aryl group substituted with a nitro group; or an aryl group substituted with one or two sulfonimide groups wherein the nitrogen atom is attached to carbonyl groups; X can be a hydrocarbon or halogen-substituted hydrocarbon radical or halogen wherein these terms have the same meanings given above, and $n$ is an integer of 0–6.

2. A flame retardant composition comprising a polyamide having recurring amide groups as part of the polymer chain and an effective amount of a substituted sulfonylphthalimide compound of the formula

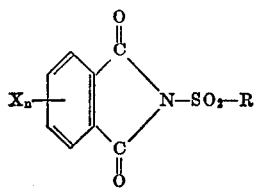

wherein R can be a hydrocarbon or halogen-substituted hydrocarbon radical, said hydrocarbon selected from the group consisting of alkyl, aryl, aralkyl and alkaryl groups and said halogen being chlorine or bromine, or an aryl group substituted with one or two sulfonimide groups wherein the nitrogen atom is attached to carbonyl groups, X can be a hydrocarbon or halogen-substituted hydrocarbon radical as hereinbefore defined, chlorine or bromine and $n$ is an integer from 0 to 4.

3. A composition according to claim 1 wherein R is aryl, aralkyl, haloaryl or sulfonimide-substituted aryl wherein the nitrogen atom is attached to carbonyl groups and $n$ is 0.

4. A composition according to claim 3 wherein R is tolyl.

5. A composition according to claim 3 wherein R is phenyl.

6. A composition according to claim 3 wherein R is p-bromophenyl.

7. A composition according to claim 3 wherein R is 2,4,5-trichlorophenyl.

8. A composition according to claim 3 wherein R is phenyl-3,5-disulfonylphthalimide.

9. A composition according to claim 1 wherein R is 2,4,6-trimethyl benzene.

10. A composition according to claim 1 wherein R is nitrophenyl.

11. A composition according to claim 1 wherein the substituted sulfonylimide compound is N-(p-toluenesulfonyl)tetrachlorophthalimide.

12. A composition according to claim 1 wherein the substituted sulfonyl imide compound is N-(p-toluenesulfonyl) - 5 - norbornene - 1,4,5,6,7,7 - hexachloro - 2,3-dicarboxylic imide.

13. A composition according to claim 1 wherein the substituted sulfonyl imide compound is N-(p-toluenesulfonyl)1,4 - methanonaphthalene - 1,2,3,4,9,9 - hexachloro - 1,4,4a,5,6,7,8,8a - octahydro - 6,7 - dicarboxylic imide.

14. A composition according to claim 1 wherein the polyamide is polycaprolactam.

15. A composition according to claim 1 wherein the polyamide is polyhexamethyleneadipamide.

References Cited

UNITED STATES PATENTS

| | | | |
|---|---|---|---|
| 2,573,580 | 10/1951 | Ladd | 260—607 |
| 2,795,589 | 6/1957 | Bluestone | 260—326 |
| 3,280,143 | 10/1966 | Hayes | 260—326 |
| 3,313,763 | 4/1967 | Creighton et al. | 260—41 |
| 3,340,273 | 9/1967 | Hayes | 260—326 |
| 3,489,715 | 1/1970 | Bierwirth et al. | 260—41 |
| 3,551,360 | 12/1970 | Dressler | 260—2.5 |
| 3,663,495 | 5/1972 | Michael | 260—37 |

OTHER REFERENCES

Heller: "Journal of Chemical and Engineering Data," vol. 15, No. 2, 1970, pp. 351 and 352.

DONALD E. CZAJA, Primary Examiner

R. A. WHITE, Assistant Examiner

U.S. Cl. X.R.

260—37 N